United States Patent [19]

Hewitt

[11] 4,023,549

[45] May 17, 1977

[54] EXHAUST TEMPERATURE MONITORING SYSTEM

[76] Inventor: John T. Hewitt, 1021 Camino Real, Redondo Beach, Calif. 90277

[22] Filed: May 23, 1975

[21] Appl. No.: 580,323

[52] U.S. Cl. .................. 123/198 D; 123/198 DB; 73/137; 323/75 H; 340/57; 73/343.5

[51] Int. Cl.² ........................................ F02B 77/08

[58] Field of Search ............... 73/137, 343.5, 346; 123/41.15, 198 D, 198 DB, 102; 323/75 H; 340/57

[56] References Cited

UNITED STATES PATENTS

| | | | |
|---|---|---|---|
| 2,359,767 | 10/1944 | Keinath | 73/137 |
| 3,401,274 | 9/1968 | Marsh | 123/102 |
| 3,568,648 | 3/1971 | Cass | 123/41.15 |
| 3,599,049 | 8/1971 | Barnard | 123/198 D |
| 3,602,207 | 8/1971 | Kilmer | 123/198 D |
| 3,605,711 | 9/1971 | Fuso | 123/198 D |
| 3,763,397 | 10/1973 | Yockers | 123/198 D |
| 3,775,745 | 11/1973 | Kelley | 123/41.15 |
| 3,817,104 | 6/1974 | Sapir | 323/75 H |
| 3,841,291 | 10/1974 | Ludewig et al. | 123/41.15 |
| 3,851,469 | 12/1974 | Eichler et al. | 123/198 DB |
| 3,895,283 | 7/1975 | Peterson | 323/75 H |

Primary Examiner—Charles J. Myhre
Assistant Examiner—Paul Devinsky
Attorney, Agent, or Firm—Fulwider, Patton, Rieber, Lee & Utecht

[57] ABSTRACT

An exhaust temperature monitoring unit including a thermocouple connected in summation with a regulated signal across the differential inputs of an operational amplifier to provide a temperature signal which is independent of the thermocouple ground. The operational amplifier drives a photocoupler at the output which in turn controls three functions. The first function provides an immediate audio alarm when a differential unbalance in the overheated direction is applied to the amplifier, the other two functions turning on a recorder and reducing fuel flow to the engine after a predetermined time delay.

10 Claims, 3 Drawing Figures

EXHAUST TEMPERATURE MONITORING SYSTEM

BACKGROUND OF THE INVENTION

1. Field of the Invention

The present invention relates to engine exhaust temperature monitoring systems and, more particularly, to a selectively engaged recording system which is connected to record all instances of excessive exhaust temperature.

2. Description of the Prior Art

Monitoring of an exhaust manifold by way of various temperature sensors has been known in the past. Typically, the exhaust temperature of an engine, and particularly a diesel engine, can be increased by excess use of fuel. Continued use of an engine at abnormally high temperatures in addition to the loss in efficiency grossly decreases the life of many components thereof.

In fleet operations such as a commercial trucking fleet, extending the useful life of a diesel engine is often a significant economic factor. It is, however, normally possible to drive a truck at a constant speed at various fuel mixtures settings. Thus, an operator may have acquired improper habits and while still meeting schedules may be inadvertently overheating the engine. Since various employees assigned to any one truck in the fleet may have, by way of prior employment, acquired such improper driving habits, monitoring this critical parameter becomes important both for maintenance purposes and for the purpose of retraining the employees to more correct habits.

Since abnormal operation is not a continuing phenomenon, continued monitoring recording of this parameter would entail large costs both in the recording paper and in the subsequent necessary inspection of the records. Since generally any engine is designed for a particular thermal balance and will operate optimally when maintained within the balanced state, it is only the instance of excess that are of interest to any fleet owner.

In addition, while a continued over temperature operating condition may indicate improper driving habits, this same data is indicative of many other engine malfunctions and is therefore significant to preventive maintenance. Generally, sensing of the operating temperatures within an engine are best accomplished by monitoring the exhaust temperatures thereof. In the prior art, and in this invention, the use of a thermocouple as the monitoring instrument is the manifold provides the most economic means of reading out the temperature. Thermocouples, however, typically generate small signals and are subject to various sources of noise and drift, the most particular of which is the existance of ground differentials or ground loops within the vehicle.

SUMMARY OF THE INVENTION

Accordingly, it is the general purpose and object of the present invention to provide an exhaust temperature monitoring system which selectively engages a recorder during those times when a temperature above a predetermined level is sensed. Further objects of the invention are to provide an exhaust temperature monitoring system which utilized a thermocouple in a circuit independent of the vehicle ground, whereby good contact with the manifold can be made and variations in ground potential along the vehicle chassis are isolated from causing erroneous readings. Further objects of the invention are to provide a monitoring and recording system which requires few parts, is easy to maintain and convenient in use.

Briefly, these and other objects are accomplished within the present invention by inserting a thermocouple into the wall of an exhaust manifold, the thermocouple having one lead thereof connected to the wiper of a potentiometer connected across a regulated signal source and the other lead thereof connected to the positive terminal of a comparator. To provide isolation from local ground, the regulated signal source and the two ends of the potentiometer as well as the reference input to the comparator are connected across the output of a D.C.-to-D.C. converter which in turn is driven by a voltage regulator powered by the vehicle battery. The output of the comparator is then connected by way of a photocoupler to three drivers, one controlling an audio alarm, another controlling after a predetermined time delay a recorder such as a tachograph, and the third controlling a valve which reduces the fuel supply to the engine.

More specifically, the driver output controlling the recorder and the fuel valve includes a fast charge-slow discharge delay whereby temporary spikes in exhaust temperature are ignored and are not registered in the recorder nor do they interrupt fuel flow to the vehicle.

DESCRIPTION OF THE SPECIFIC EMBODIMENTS

Figure 1:
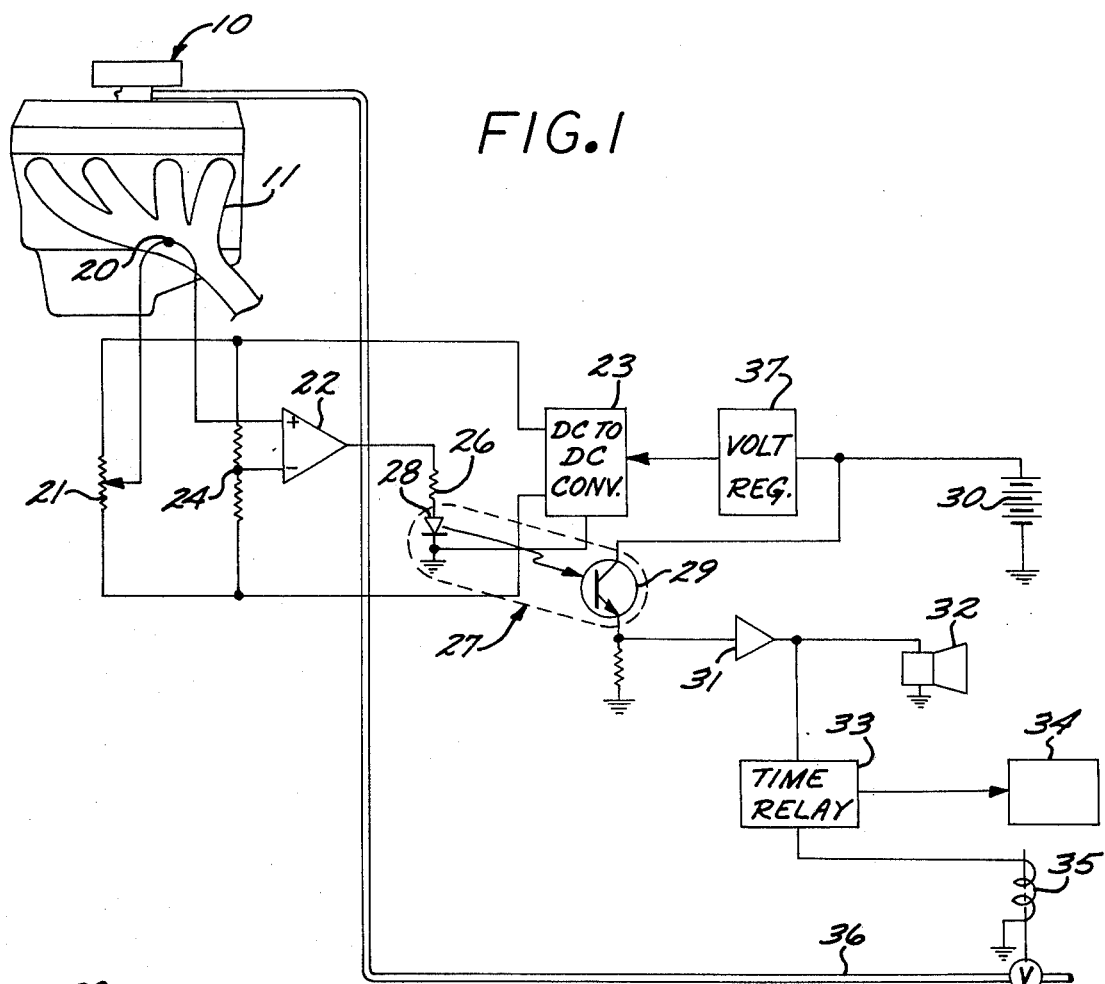
FIG. 1 is a block diagram illustrating a generalized arrangement of the various parts connected according to the present invention.

As shown in FIG. 1, a diesel engine, generally designated by the numeral 10, is provided with an exhaust manifold 11 according to the conventional practice in the art. A thermocouple 20 is installed within the wall of the exhaust manifold 11, connecting by one lead to the wiper of a potentiometer 21 and by the other lead to the positive input terminal of an operational amplifier 22. The output of a D.C.-to-D.C. converter 23 is connected across the two ends of potentiometer 21, converter 23 furthermore exciting a voltage divider 24 which at the division point sets the negative reference of the operational amplifier 22. In this manner, amplifier 22 operates in a differential mode between saturation limits in response to the polarity of the signal difference between the two inputs. Thus, by balancing the inputs at the desired upper temperature limit, the additional signal developed at the junction of the thermocouple 20 can be set to swing amplifier 22 from its negative saturation to its positive saturation when the set temperature is exceeded. At the output, amplifier 22 then connects across a limiting resistor 26 to a convertional coupling device 27 comprising a light-emitting diode 28 connected between resistor 26 and converter common, and a phototransistor 29 connected in an emitter-follower circuit between the plus side of the vehicle battery 30 and the chassis ground.

Accordingly, each time the temperature in manifold 11 exceeds the input balance to amplifier 22, diode 28 will be biased in the forward conduction mode, lighting up to render phototransistor 29 conductive. Quick response to manifold temperature is assured since direct thermocouple contact with the manifold can be made by virtue of this circuit arrangement. When transistor 29 conducts, a voltage is developed across the emitter resistor thereof to operate a driver stage 31 which is connected to an audio alarm 32 and, across a time delay 33, to a recorder 34 and a control valve 35. Valve 35 then reduces the fuel flow within a fuel line 36 of the vehicle and will therefore prevent possible catastrophic damage to engine 10. To provide for mobile use, a battery 30 is shown connected to the input of a voltage regulator 37 which provides the requisite regulated power to the D.C.-to-D.C. converter 23.

The particular arrangement of the thermocouple 20 between the wiper of potentiometer 21 and the positive input terminal of amplifier 22 provides for a floating reference with respect to local ground and any thermal contact shorting of either one of the leads of thermocouple 20 will therefore not effect the accuracy of the reading thereof. This sensing arrangement is further isolated from ground by virtue of the coupling arrangement within the photocoupler 27.

Figure 3:
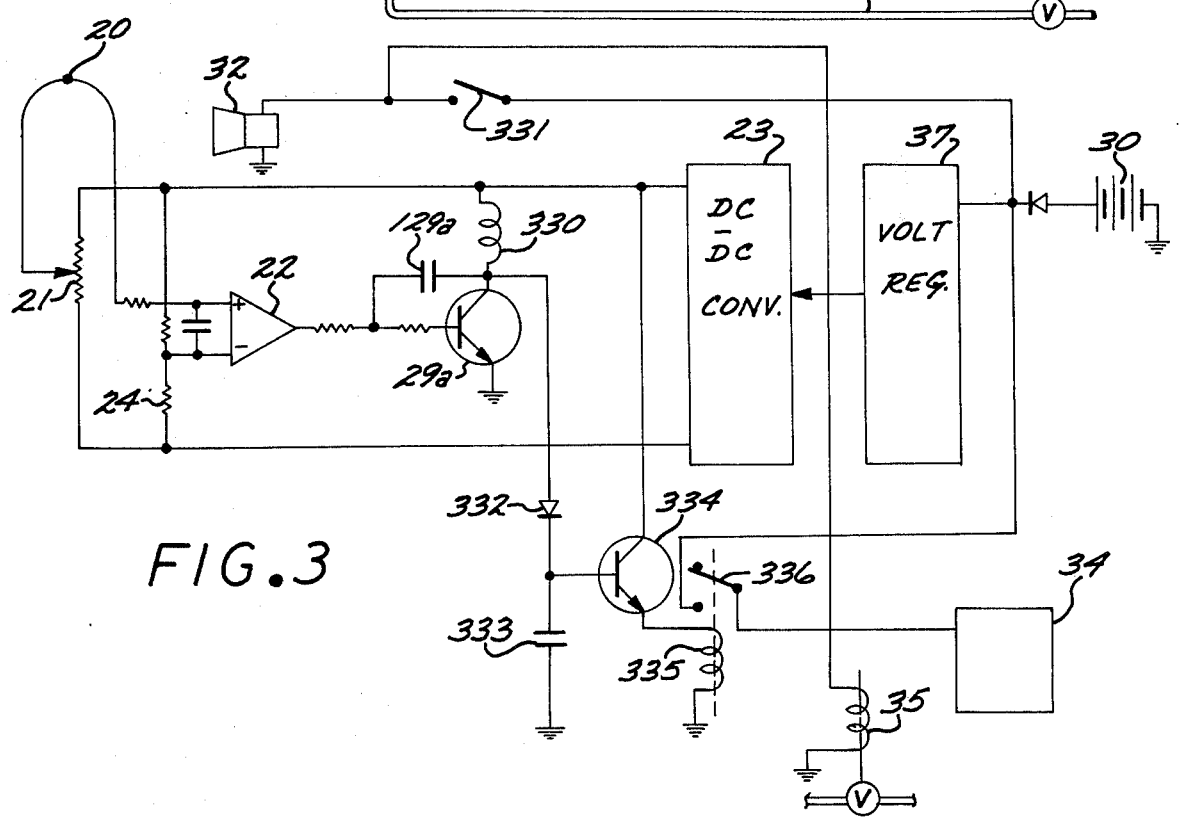
FIG. 3 is yet another circuit diagram illustrating a second detailed embodiment of the invention generally shown in FIG. 1, this second embodiment including solid state control devices.
Figure 2:
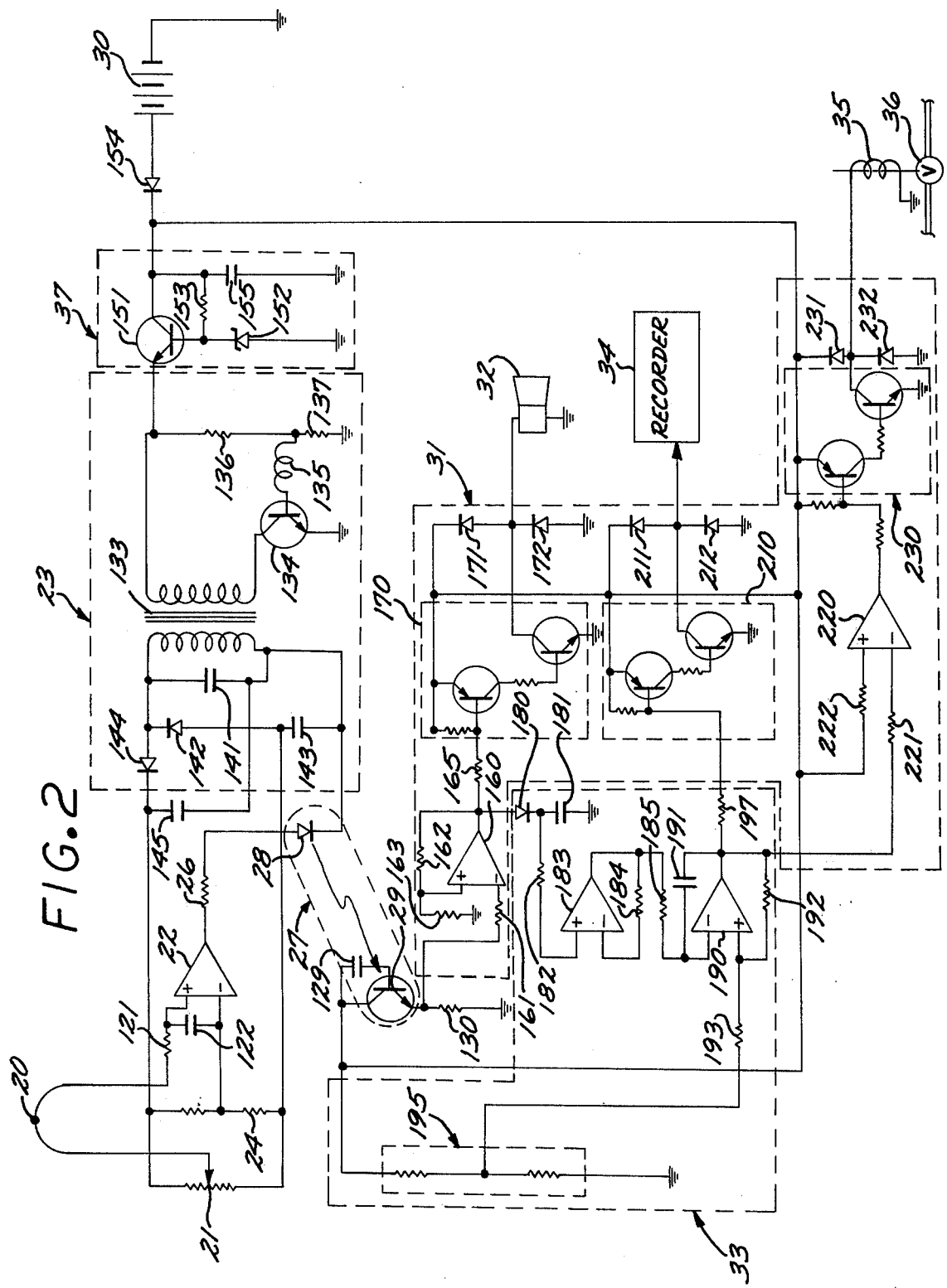
FIG. 2 is a detailed circuit diagram illustrating one embodiment of the invention wherein electromechanical switching devices are utilized for control.

While there are many possible ways of carrying out the general circuit arrangement shown in FIG. 1, two specific embodiments illustrating practical examples thereof are shown in FIGS. 2 and 3, respectively. In order to abbreviate the description of FIGS. 2 and 3 following herein, the features common to both embodiments are shown with particularity in FIG. 2 and only generally referred to in FIG. 3. Thus, in specific detail the sensing section around thermocouple 20 is common to both circuits and is described in detail in FIG. 2, it being intended that the same circuit components by utilized for the sensing section of FIG. 3.

As shown in FIG. 2, one lead from thermocouple 20 is connected at the wiper of potentiometer 21, with the other connecting across an input resistor 121 to the positive input terminal of amplifier 22. Thus, amplifier 22 is operating in a differential mode where the two inputs of the amplifier are further connected by a capacitor 122 to take out transients. The output of amplifier 22 then connects in the aforementioned manner to excite the light-emitting diode 28.

The detailed embodiment of the D.C.-to-D.C. converter 23 is centered about a transformer 133 having the primary thereof connected in an oscillator circuit between the output of voltage regulator 37 and a transistor 134 connected in a common emitter mode to ground. Transistor 134 is controlled at the base by a feedback winding 135 of transformer 133 connected at the other end to the division point of a voltage divider across the regulated output including an upper resistor 136 and a lower resistor 137. The secondary of transformer 133 sets the desired voltage ratio and further provides a capacitor 141 to obtain a peak response at the driving frequency from the transistor 134 and transformer 133. This oscillating output across capacitor 141 is rectified by a diode 142 in series with a capacitor 143. The anode of diode 142 therefore provides the negative signal to potentiometer 21 while the lower end of capacitor 143 provides the ground return. The upper end of the secondary of transformer 133 is furthermore connected in forward bias across a diode 144 to the upper side of potentiometer 21. In addition, a filtering capacitor 145 is connected between the cathode of diode 144 and the converter common. By way of this circuit arrangement, a D.C.-to-D.C. converter is formed wherein the regulated D.C. voltage is converted to a higher D.C. signal with the ground thereof referenced to one end of the secondary of the transformer.

The regulated voltage is developed at the voltage regulator 37 in a manner conventional in the art. More specifically, regulator 37 is shown as a series regulated voltage regulator wherein most of the regulation occurs in the collector-emitter path of a transistor 151. Transistor 151 is referenced with respect to ground at the base terminal thereof by a Zener diode 152, the cathode of the Zener diode 152 being furthermore connected across a base-collector resistor 153 to the cathode of a forward biased diode 154 in the positive circuit from a battery 30. To filter any noise at the collector of transistor 151, a capacitor 155 is connected to ground therefrom. The cathode output of diode 154 also provides a smoothed and rectified battery voltage which is used as an unregulated power source for the circuit elements described hereinbelow.

With the foregoing description of the circuit around amplifier 22, the circuit comprising the D.C-to-D.C. converter 23 and the circuit providing the voltage regulation, a common implementation of the sensing section of the circuits is shown which is applicable to both of the detailed embodiments described herein. Accordingly, the embodiment shown in FIG. 3 when referring to the sensing section will be illustrated by way of the original generalized blocks only, it being understood that the structure thereof be identical to that shown for the same corresponding blocks in FIG. 2.

As previously disclosed, diode 28 is a light-emitting diode and is forward biased by the output of amplifier 22 to emit light to the phototransistor 29. Phototransistor 29 includes a base-to-collector capacitive connection, or a capacitor 129, and an emitter resistor 130 to ground. The collector of transistor 29 is connected to the battery 30 output at the cathode of diode 154. Thus, each time diode 28 lights up, transistor 29 is rendered conductive, capacitor 129 is stabilizing the operation thereof. When transistor 29 conducts, a voltage is impressed across resistor 130, that voltage signal being connected across an input resistor 161 to the negative input terminal of an operational amplifier 160. Amplifier 160 includes a positive feedback resistor 162 and a ground referencing resistor 163 tying the positive terminal to ground. The output of amplifier 160 drives across a resistor 165 a complementary output stage generally shown as stage 170. The output transistor of stage 170 in turn controls the coil of the audio alarm 32 across a clamping circuit comprising diodes 171 and 172 connected again between battery 30 and ground.

In addition, the output of amplifier 160 connects across a diode 180 to one end of a capacitor 181 which at the other end connects to ground. The ungrounded end of capacitor 181 is then connected through an input resistor 182 to the positive input terminal of yet another operational amplifier 183 configured for unity gain by a negative feedback resistor 184. Amplifier 183 therefore serves the function of a buffer. Amplifier 183 in turn drives through an input resistor 185 the inverting input terminal of an operational amplifier 190 which includes a high frequency roll off negative feedback 191 and a positive resistive feedback 192, the positive input terminal thereof further receiving, across an input resistor 193, a reference voltage developed at the division point of a resistive divider 195 connected again between battery 30 and ground. The combination of amplifiers 183 and 190 and capacitor 181 provides for fast charge-slow discharge output which in turn controls a complementary stage 210, controlling across a clamping circuit comprising diodes 211 and 212, a recorder 34. Thus, the fast charge-slow discharge is accommodated to provide filtering of any exhaust temperature transients.

The output of amplifier 190 is again connected across an input resistor 221 to the negative input terminal of an operational amplifier 220 which at the positive input terminal, across an input resistor 222, receives the battery signal. Amplifier 220, similar to amplifiers 190 and 160, controls yet another complementary stage 230 which through a clamping circuit comprising diodes 231 and 232, controls valve 35 in the fuel line 36.

It is to be noted that by this description amplifier 22 operates in a manner of an LED driver. Amplifier 183 is configured as a unity gain amplifier and therefore performs the functions of a buffer. By way of this description, amplifier 183, capacitor 181 and amplifier 190 provide the requisite operation of the delay circuit described above and designated as circuit 33. The driver stage designated hereinabove as driver 31 is shown in this embodiment in distributed form and the single connection shown in FIG. 1 is therefore illustrative only, indicating the operation of amplifiers 160, 190 and 220 together with the complementary stages 170, 210 and 230.

A similar arrangement of functions is shown in FIG. 3, this Figure however illustrating an electromechanical execution of these functions. In FIG. 3, a direct coupling is made between the output of amplifier 22 and the various operational devices of the system. More specifically, the function of transistor 29 is taken or is performed by a conventional common emitter transistor 29a including a base-to-collector capacitor 129a. The collector of transistor 29a controls a relay winding 330 connected from the positive output of the D.C.-to-D.C. converter 23, winding 330 in turn, when connected to ground across transistor 29a, pulling in a switch 331 between the battery 30 and the audio alarm 32 and valve 35. The collector of transistor 29a is furthermore connected to the anode of a diode 332 in series with a capacitor 333 to ground. The junction between diode 332 and capacitor 333 controls the base of a transistor 334 which is connected, providing the time delay function, by its collector to again the positive output of the D.C.-to-D.C. converter 23, and which by its emitter connects to yet another relay winding 335. Relay winding 335 in turn controls opening of a switch 336 interrupting the power from the battery 30 to the recorder 34. In this configuration, the valve 35 in particular is shown as a normally opened valve and recorder 34 is inactive during those times when battery input is applied thereto. Thus, attempts at bypassing the recorder would necessarily entail an internal shunt within the circuit enclosure itself, bypassing switch 336. In addition, various known ways of preventing unauthorized entry into this circuit may be implemented which if broken would allow detection of such unauthorized entry. Thus, the operator of a vehicle will be prevented from bypassing the operation of this system, or if he does make attempts to do so will be discovered and continued excesses in the use of the vehicle will be thus recorded.

Some of the many advantages of the present invention should now be readily apparent. The invention provides, by way of components which are reliable, easy to maintain and easy to adjust, a temperature responsive system which is independent of local ground and therefore will allow for direct thermal contact with the structure monitored. These advantages are obtained by a device which utilizes conventional parts having the attendant reliability and convenience in adjustment.

Obviously, many modifications and variations of the present invention may be made with regard to the foregoing detailed description without departing from the spirit of the invention.

I claim:

1. An exhaust temperature monitoring system for use in a vehicle having an exhaust manifold, comprising:
   thermocouple means having dual electrical leads and adapted for thermal contact with said manifold for producing a thermocouple electrical signal across said leads corresponding to the temperature of said manifold;
   a voltage reference circuit having two reference lines for producing a ground isolated reference signal independent of the vehicle ground between said two reference lines;
   first division means connected across said reference signal lines and to one lead of said thermocouple means for applying a first preselected ratio of said ground isolated reference signal to one lead of said thermocouple means:
   second division means connected across two reference lines for producing a second preselected ratio of said ground isolated reference signal;
   differential summing means connected to the other lead of said thermocouple means and to said second division means for producing a ground isolated output signal indicative of the differential between the signal combination of said thermocouple electrical signal combined with said first ratio of said ground isolated reference signal and said second ratio of said ground isolated reference signal;
   optical coupling means for receiving said ground isolated output signal from said thermocouple means and for generating a responsive output signal at a potential with respect to ground; and
   audio alarm means operatively connected to said optical coupling means for producing an audio signal when said differential summing means producing an output signal of a predetermined polarity.

2. Apparatus according to claim 1 wherein: said first division means includes a potentiometer connected at the distal ends thereof across said reference signal and at the wiper end thereof to one side of said thermocouple means; and
   said second division means includes a resistive divider disposed across said to reference signal lines.

3. Apparatus according to claim 2 wherein: said differential summing means includes an operational amplifier receiving at the positive input terminal thereof a ground isolated thermocouple signal and at the negative input terminal thereof, said second preselected ratio of said ground isolated reference signal.

4. Apparatus according to claim 3 wherein: said voltage reference circuit includes a voltage regulator and a D.C.-to-D.C. converter connected to receive the output from said voltage regulator.

5. Apparatus for detecting the exhaust temperature of an internal combustion engine, comprising:
- a thermocouple having two electrical leads;
- a ground isolated reference signal source having two lines with a voltage reference potential existing therebetween;
- a variable divider connected across said lines of said ground isolated reference signal source with a connection therefrom to one of said leads of said thermocouple;
- a fixed divider connected across said lines of said ground isolated reference signal source including two resistive elements with a voltage tap therebetween;
- a comparator receiving the other lead of said thermocouple at one input and having a connection to said voltage tap at the other input for producing a ground isolated output signal of a predetermined polarity when the temperature of said thermocouple is above a predetermined level;
- optical coupling means for receiving said ground isolated output signal from said comparator means and for generating a responsive output signal at a potential with respect to ground; and
- control means operatively connected to said optical coupling means for producing a control signal when said output signal is of said predetermined polarity.

6. Apparatus according to claim 5 further comprising delay means operatively connected between said optical coupling means and said control means for governing said control means to produce a control signal a predetermined time after said output signal.

7. Apparatus according to claim 5 wherein said ground isolated voltage source includes a voltage regulator driving a D.C.-to-D.C. converter, said converter terminating in the aforesaid two lines between which the aforesaid voltage reference potential exists.

8. Apparatus according to claim 7 further comprising:
- an audio alarm connected to receive said output signal from said comparator; and
- a recorder means connected to receive said control signal from said control means.

9. Apparatus according to claim 8 wherein said control means is a fuel control means connected to said engine to reduce the fuel flow thereto in response to said responsive output signal.

10. Apparatus according to claim 8 wherein said control means is a fuel control means connected to said engine responsive to said responsive output signal from said optical coupling means.

* * * * *